United States Patent Office 3,355,817
Patented Dec. 5, 1967

3,355,817
SEALING MEANS FOR ROTARY DRUM HEAT EXCHANGER
Rudolf Birk, Munich, Germany, assignor to Agfa-Gevaert Aktiengesellschaft, Leverkusen, Germany
Filed July 27, 1965, Ser. No. 475,161
Claims priority, application Germany, Aug. 13, 1964, A 46,838
6 Claims. (Cl. 34—124)

ABSTRACT OF THE DISCLOSURE

The cylinder of a photographic print drier is mounted with clearance on the drum by two solid elastomeric rings which are deformed into sealing engagement with the internal surface of the cylinder so that the latter is compelled to rotate with the drum. The drum has two inwardly extending flanges which are coupled with disk-shaped end walls and define therewith annular seats for the rings. The end walls are connected with the shaft of the drier and cooperate with the flanges to maintain the rings in deformed condition.

---

The present invention relates to an apparatus for drying photosensitized materials, particularly for drying strips of photographic film or paper. More particularly, the invention relates to improvements in driers wherein the material to be treated travels along the periphery of a cylindrical body in the form of a drum and wherein the drum is maintained at a predetermined temperature by a stream of circulating fluid medium.

It is already known to provide a film drying apparatus with a rotary drum whose rim is heated by a stream of circulating fluid. A serious drawback of such apparatus is that the seals which prevent escape of fluid from the drum are rather complicated, bulky and expensive. In accordance with certain prior proposals, the ends of the annular fluid receiving chamber which extends along the rim of the drying drum are sealed by inflatable rings. Such mode of sealing is satisfactory as long as the inflatable rings are free of punctures and as long as the valves which control the admission of sealing fluid into such rings are free of leaks. However, as soon as the sealing fluid begins to leak, the sealing action of the entire inflatable ring is destroyed. Also, such types of seals are quite expensive and the drier must be provided with a separate source of sealing fluid, with means for maintaining the sealing fluid under requisite compression, and with several valves which control the flow of sealing fluid to and from the inflatable rings.

Accordingly, it is an important object of the present invention to provide a drier wherein the fluid receiving chamber which extends along the rim of the rotary drum is properly sealed from the atmosphere in a novel and very simple manner and wherein the sealing action of the structure which seals the chamber is not dependent on the admission of a sealing fluid.

Another object of the invention is to provide a drier of the just outlined characteristics wherein the parts of the sealing structure may be readily assembled or taken apart, wherein such assembling or dismantling may be carried out by resorting to very simple tools, and wherein the sealing structure occupies very little room.

A further object of the invention is to provide a rotary drier for strips of photosensitive material wherein the sealing action at the ends of the fluid receiving chamber may be regulated without necessitating even partial dismantling of the drier, and wherein the sealing structure performs at least one additional function, such as transmitting motion between separate components of the drier and/or centering one of the components on the other component or components.

An additional object of the invention is to provide a novel drum which may be used in a drier of the above outlined characteristics.

A concomitant object of the invention is to provide a novel sealing structure for use in a drier of the above outlined characteristics.

A further object of the invention is to provide a novel method of assembling the components of the improved drier.

Briefly stated, one feature of my invention resides in the provision of a drier, particularly for photosensitized material including prints and strips of photographic film or paper. The drier comprises a support, a drum rotatably mounted in the support and including a rim having a smaller-diameter central portion and two larger-diameter end portions, two annular end walls each adjacent to and each defining an annular groove or seat with one of the end portions, a cylinder surrounding the rim and having an internal surface slightly spaced from the end portions of the rim, a fluid receiving chamber defined by the cylinder and the central portion of the rim, a solid (non-porous) elastic ring sealingly received in each of the two seats and frictionally engaging the adjoining portion of the internal surface on the cylinder to seal the respective end of the chamber and to rotate the cylinder in response to rotation of the drum or vice versa, and means for circulating a fluid through the chamber.

The novel features which are considered as characteristic of the invention are set forth in particular in the appended claims. The improved drier itself, however, both as to its construction and the mode of assembling the same, together with additional features and advantages thereof, will be best understood upon perusal of the following detailed description of certain specific embodiments with reference to the accompanying drawings, in which:

Figure 1:
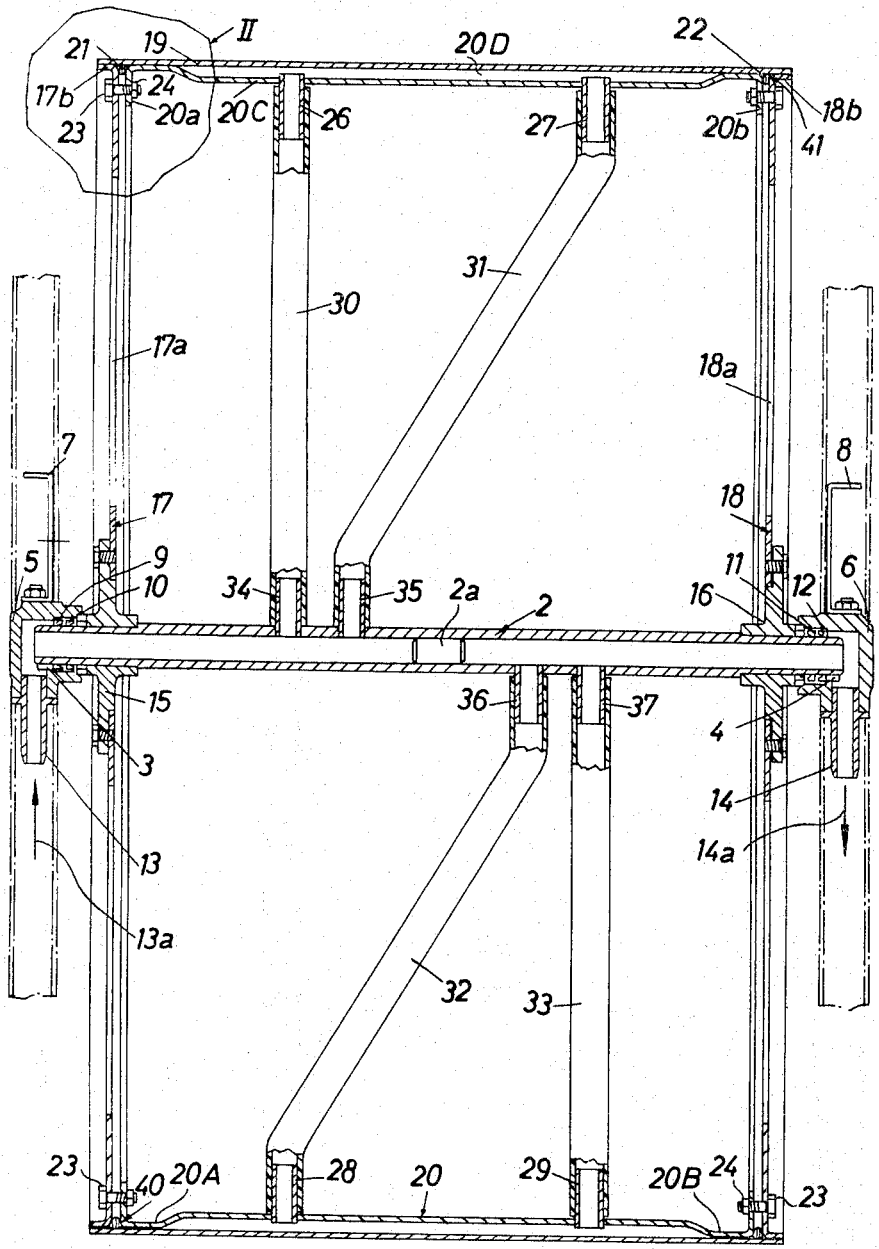
FIG. 1 is an axial section through a drier which embodies one form of my invention.

Referring to the drawings, and first to FIG. 1, there is shown a drier for strips of photographic film or paper. This drier comprises a drum including a hollow shaft 2 whose end portions 3, 4 are rotatable in bearings 5, 6 screwed to fixed frame members 7, 8 which together constitute a stationary support for the drum. The end portions 3, 4 of the hollow shaft 2 are respectively surrounded by gaskets 9, 10 and 11, 12, and the bearings 5, 6 are respectively connected with nipples 13, 14. The nipple 13 serves to admit water or another fluid medium in the direction indicated by an arrow 13a whereby such fluid enters through the left-hand end portion 3 and flows toward the central zone of the shaft 2. The nipple 14 discharges spent fluid in the direction indicated by an arrow 14a and receives such spent fluid through the right-hand end portion 4 of the shaft 2.

Figure 2:
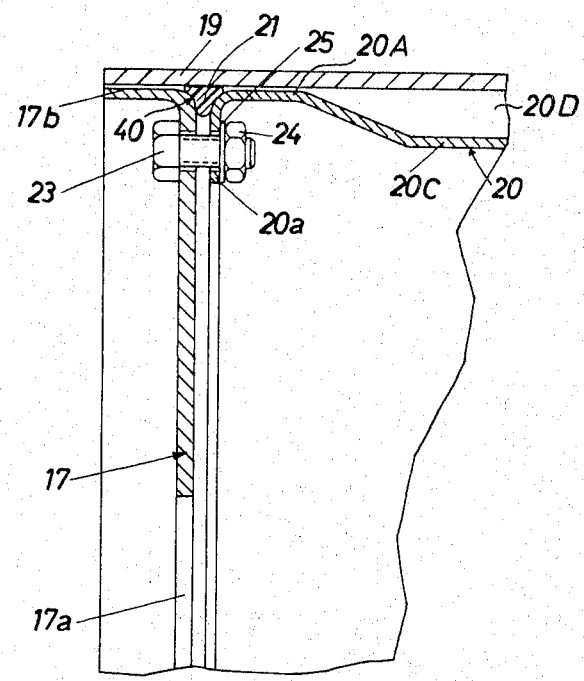
FIG. 2 is an enlarged view of a detail within the area II shown in the upper left-hand portion of FIG. 1.

The drum further comprises two annular hubs 15, 16 which are press-fitted onto the end portions 3, 4 and are bolted to a pair of annular end walls 17, 18. The outer ends of the walls 17, 18 are provided with outwardly extending cylindrical collars 17b, 18b which are coaxial with the shaft 2. There is a gradual and smooth transition between the main body portions and the collars 17b, 18b of the end walls 17, 18. This is best shown in FIG. 2 which illustrates the outermost portion of the end wall 17 together with the collar 17b. The end walls 17, 18 are further provided with relatively large cutouts or apertures 17a, 18a which afford access to the interior of the drum.

The rim 20 of the drum comprises a central portion 20C which resembles a hollow cylinder and is coaxial with the shaft 2. This rim 20 further comprises two cylindrical end portions 20A, 20B whose diameters exceed the diameter of the central portion 20C and which are respectively provided with inwardly extending annular flanges 20a, 20b adjacent to the end walls 17, 18, respectively. The rim 20 is surrounded by a smooth-surfaced cylinder or mantle 19 whose diameter is constant from end to end and whose internal surface surrounds with small clearance the end portions 20A, 20B of the rim 20. The clearance between the internal surface of the cylinder 19 and the central portion 20C is greater so that these parts define between themselves an annular fluid receiving chamber 20D which terminates in planes extending between the flanges 20a, 20b and the adjoining end walls 17, 18. It can be said that the central portions of the cylinder 19 and rim 20 together form a jacket which extends almost to the axial ends of the drier and wherein water or another suitable fluid may be circulated to maintain the cylinder 19 at an optimum temperature such as is required for rapid drying of certain types of photosensitized material.

The means for circulating the fluid through the chamber 20D includes the aforementioned nipples 13, 14, two pairs of nipples 26, 27 and 28, 29 which extend radially inwardly from the central portion 20C, two pairs of nipples 34, 35, and 36, 37 which extend radially outwardly from the shaft 2, and four flexible hoses or pipes 30, 31 32, 33. A plug 2a is inserted into the central portion of the shaft 2 to seal the nipples 13, 34, 35 from the nipples 14, 36, 37. The fluid which is circulated by a pump or by gravity feed enters in the direction of the arrow 13a and flows through the end portion 3, through the nipples 34, 35 and hoses 31, 30, through the nipples 26, 27 and through the chamber 20D, through the nipples 28, 29 and hoses 32, 33, through the nipples 36, 27, through the end portion 4 and nipple 14, and is returned to the source by flowing in the direction of the arrow 14a. It is clear that the direction of fluid flow may be reversed and that fluid issuing from the nipple 14 need not be returned to the source which feeds fluid to the nipple 13.

The difference between the external diameters of the end portions 20A, 20B and the internal diameter of the cylinder 19 is rather small so that the cylinder is automatically centered on the drum when it is caused to assume the position shown in FIG. 1.

The flange 20a defines with the adjoining portion of the end wall 17 and with the left-hand portion of the cylinder 19 an annular groove or seat 40, best shown in FIG. 2, which receives an elastic ring 21 in such a way that the ring is deformed and is caused to remain in strong frictional engagement with the adjoining portion of the internal surface on the cylinder 19. At the same time, the ring 21 is in sealing engagement with the adjoining portions of the parts 20A and 17 so that the left-hand end of the chamber 20D is fully sealed from the atmosphere. The ring 21 serves also as a means for rotating the cylinder 19 in response to rotation of the drum or vice versa.

The parts 20B and 18 define between themselves a second annular seat 41 which receives a second elastic ring 22, the latter being held in deformed condition and frictionally engaging the internal surface of the cylinder 19 to seal the right-hand end of the chamber 20D. FIG. 2 shows clearly that the external diameter of the collar 17b is slightly smaller than the internal diameter of the cylinder 19. The same holds true for the collar 18b and the right-hand end portion of the cylinder 19. Therefore, the cylinder can be readily telescoped onto the drum. FIG. 2 shows further that the annular seat 40 and the ring 21 is of substantially triangular cross section and that the collar 17b and flange 20a extend substantially tangentially of the ring. Such portions of the collar 17b and flange 20a which are immediately adjacent to the ring 21 are curved to provide smooth transitions into the main body portions of the parts 17 and 20A. The cross-sectional outline of the right-hand seat 41 is of similar shape.

Figure 3:
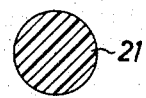
FIG. 3 is an enlarged section through a sealing ring which may be utilized in the drier of FIG. 1.
Figure 4:
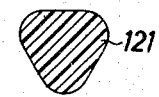
FIG. 4 is an enlarged section through a modified sealing ring.

The rings 21 and 22 consist of highly elastic heat-resistant material, preferably silicone rubber or another suitable solid elastomeric material which is readily deformable but does not reduce its volume when subjected to compressive stresses. FIG. 3 shows that the cross section of the ring 21 is of circular outline. The ring 22 is of identical shape. If desired, the rings 21, 22 may be replaced by rings of substantially triangular cross section. One such ring 121 is shown in FIG. 4.

The means for compressing the rings 21, 22 in their respective seats 40, 41 comprises two sets of bolts 23 or similar threaded fasteners. FIG. 2 shows a bolt 23 which extends through aligned bores provided in the end wall 17 and flange 20a and cooperates with a nut 24 to subject the ring 21 to requisite deforming stresses. One or more elastic washers 25 may be interposed between the nut 24 and the inner side of the flange 20a. It is clear that the drum comprises a large number of bolts 23 which are uniformly distributed along the collar 17b and that the connection between the flange 20b and right-hand end wall 18 comprises a second set of similarly distributed fasteners.

Since the volume of the rings 21, 22 is not reduced when the nuts 24 are driven home, the rings will undergo deformation and will be caused to form fluidtight seals along the respective ends of the cylinder 19 to prevent escape of fluid from the chamber 20D. The sealing action of the rings 21, 22 along the internal surface of the cylinder 19 is uniform and each of these rings is in large-area face-to-face abutment with the cylinder. As stated before, the rings 21, 22 also serve to transmit motion between the drum and the cylinder 19 regardless of whether the drum rotates in the bearings 5, 6 in response to torque transmitted by the cylinder 19, or vice versa. A very important advantage of the rings 21, 22 is that the cylinder 19 is not subjected to stresses which are concentrated in certain zones thereof so that the cylinder 19 retains its circular cylindrical shape even if it consists of relatively thin sheet material.

The gaps between the cylinder 19 and the parts 20A, 20B, 17b, 18b need not be too narrow because the dimensions of the rings 21, 22 may be selected in such a way that each thereof provides a satisfactory seal regardless of the exact width of such gaps.

It was found that the sealing action of the rings 21, 22 is especially satisfactory if the surfaces of the parts 17, 18 and 20 which come into direct contact with these rings make with the axis of the drum an angle of less than 60 degrees. However, and as actually shown in the drawings, it normally suffices if the radii of curvature of the flanges 20a, 20b and collars 17b, 18b are sufficiently large to provide for a large-surface contact with the rings 21, 22.

It is clear that the end walls 17, 18 can be permanently connected with the collars 20a, 20b of the rim 20 without departing from the spirit of my invention. In such instances, the collars 17b, 18b may be replaced by detachable annuli which are bolted or otherwise connected to the drum to subject the rings 21, 22 to requisite deforming stresses and to insure that the rings seal the respective ends of the chamber 20D. The two detachable rings then constitute the end walls of the drum.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a drier for photographic material or the like, a rotary drum having a rim including a central portion of smaller diameter and two end portions of larger diameter; a cylinder spacedly surrounding said rim and defining a fluid receiving chamber with said central portion of the rim; a pair of solid elastic rings interposed between said end portions and said cylinder; and means for deforming said rings into surface-to-surface engagement with said cylinder and said end portions so that said rings seal the respective ends of said chamber and constitute the sole means to transmit torque from said cylinder to said drum or vice versa.

2. In a drier for photographic material or the like, a rotary drum having a rim including a central portion of smaller diameter and two end portions of larger diameter; a cylinder spacedly surrounding said rim and defining a fluid receiving chamber with said central portion of the rim; a pair of solid elastic rings interposed between said end portions and said cylinder; means for deforming said rings into surface-to-surface engagement with said cylinder and said end portions so that said rings seal the respective ends of said chamber and constitute the sole means to transmit torque from said cylinder to said drum or vice versa, said deforming means comprising a pair of annular members extending with clearance into said cylinder and fastener means securing said annular members only to the respective end portions of said rim; and means for circulating a fluid through said chamber.

3. A drier, particularly for photosensitized material, comprising rotary drum means including a rim having a smaller-diameter central portion and two larger-diameter end portions, said drum means further including two annular end walls each adjacent to and each defining an annular seat with one of said end portions; a shaft extending coaxially through said drum means and connected with said end walls; cylinder means surrounding said rim and having an internal surface slightly spaced from said end portions, said cylinder means and said central portion defining between themselves an annular fluid receiving chamber; a solid elastic ring sealingly received in each of said seats and frictionally engaging the adjoining portion of said internal surface to seal the respective end of said chamber, said rings constituting the sole devices for rotating one of said means in response to rotation of the other means; means for connecting said end portions with the respective end walls and for thereby maintaining said rings in deformed condition; and means for circulating a fluid through said chamber.

4. A drier, particularly for photosensitized material, comprising a support; a drum rotatably mounted in said support and including a rim having a smaller-diameter central portion and two larger-diameter end portions, said drum further including two annular end walls each adjacent to and each defining an annular seat with one of said end portions, each of said end walls having a cylindrical collar extending away from the adjoining end portion of said rim; a cylinder surrounding said rim and having an internal surface slightly spaced from said collars and said end portions, said cylinder and said central portion defining between themselves a fluid receiving chamber; a ring of solid elastomeric material sealingly received in deformed condition in each of said seats due to compression between one of said end walls and the adjoining end portion of said rim so that the rings are held in frictional engagement with the adjoining portions of said internal surface to seal the respective ends of said chamber and to couple said cylinder for rotation with said drum; and means for circulating a fluid through said chamber.

5. A drier as set forth in claim 4, wherein each of said rings has a substantially circular cross section in undeformed condition thereof.

6. A drier as set forth in claim 4, wherein each of said rings has a substantially triangular cross section in undeformed condition thereof.

References Cited

UNITED STATES PATENTS 2,964,297—12/1960 Davis et al. _____ 34—124
3,169,050 2/1965 Kroon _____ 34—124

FREDERICK L. MATTESON, JR., *Primary Examiner.*

A. D. HERRMANN, *Assistant Examiner.*